May 17, 1966   H. G. PARKE   3,252,087
METHOD AND APPARATUS FOR IDENTIFYING WIRES
Filed June 15, 1961   2 Sheets-Sheet 1

INVENTOR.
HARRY G. PARKE
BY
ATTORNEY

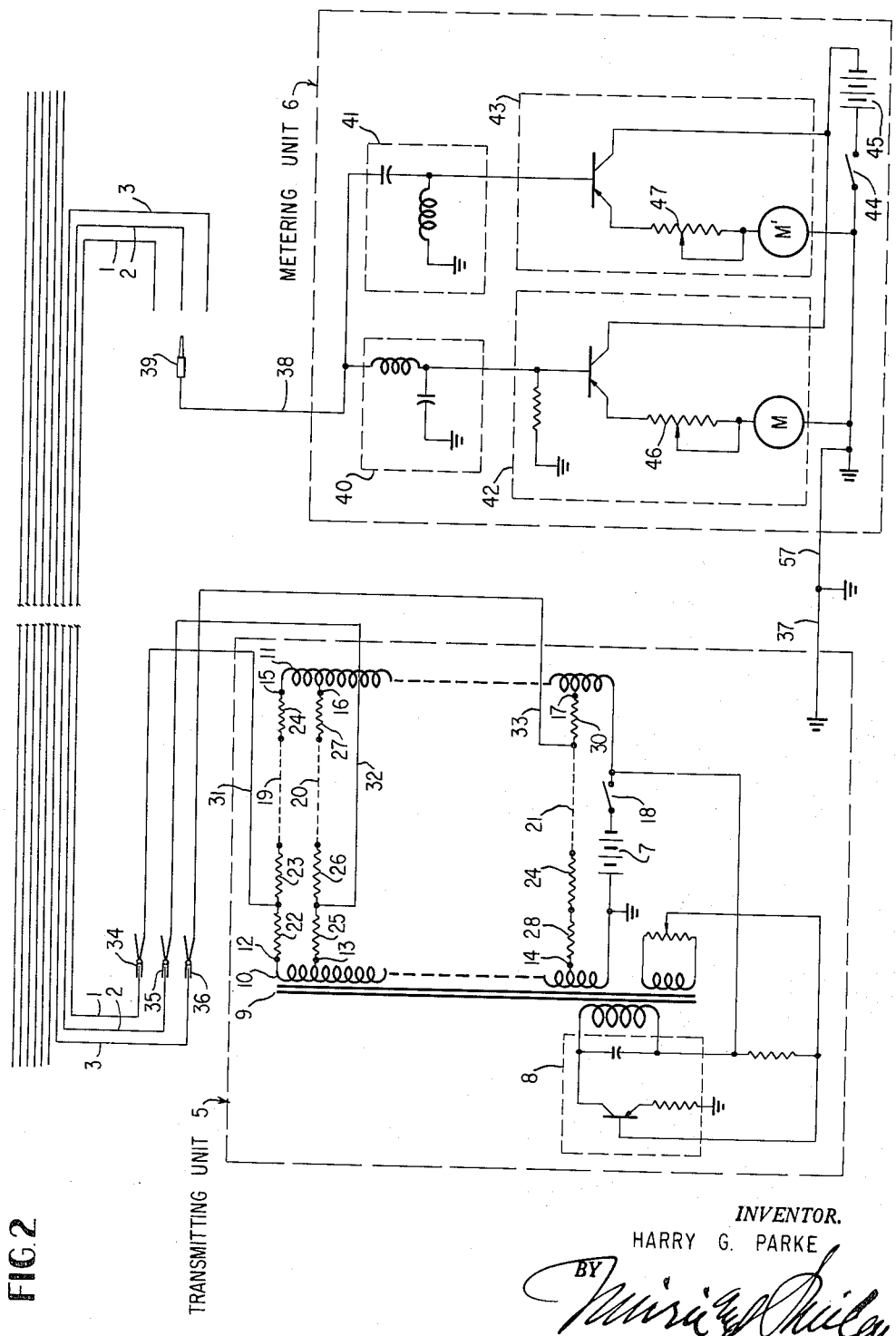

United States Patent Office 3,252,087
Patented May 17, 1966

3,252,087
METHOD AND APPARATUS FOR IDENTIFYING WIRES
Harry G. Parke, Brooklyn, N.Y., assignor to Marine Electric Corporation, Brooklyn, N.Y., a corporation of New York
Filed June 15, 1961, Ser. No. 117,207
12 Claims. (Cl. 324—66)

This invention relates to a device for simplifying the identification of individual conductors in runs of multiple conductor cable, as for example, between two distant junction boxes on a ship or plane.

Present technique for identifying conductors usually involves a man at each end of the cable, connected by phones, and the use of a battery and lamp or bell to ring out the conductors one at a time by trial and error. One man applies potential across a ground and the identified end of one conductor while the other man, with a probe and the indicator lamp connected to a ground, touches the probe to the conductors until he finds the one which energizes the indicator. This procedure is slow and expensive, particularly when a large number of wires are involved, since a random search must be made for each wire.

It is a primary object of this invention to provide a device whereby conductor identification can be performed by one man, and at much higher speeds.

Another object of the invention is to provide means for applying at least two potentials of different frequency to each conductor and uniquely identifying a plurality of conductors by differences of the potentials applied to each so that measurement of the potentials of different frequency at the remote cable end quickly identifies each conductor.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings wherein like reference characters indicate like parts throughout the several figures and in which:

FIG. 2 is a schematic circuit diagram of the apparatus illustrated in FIG. 1.

Figure 1:
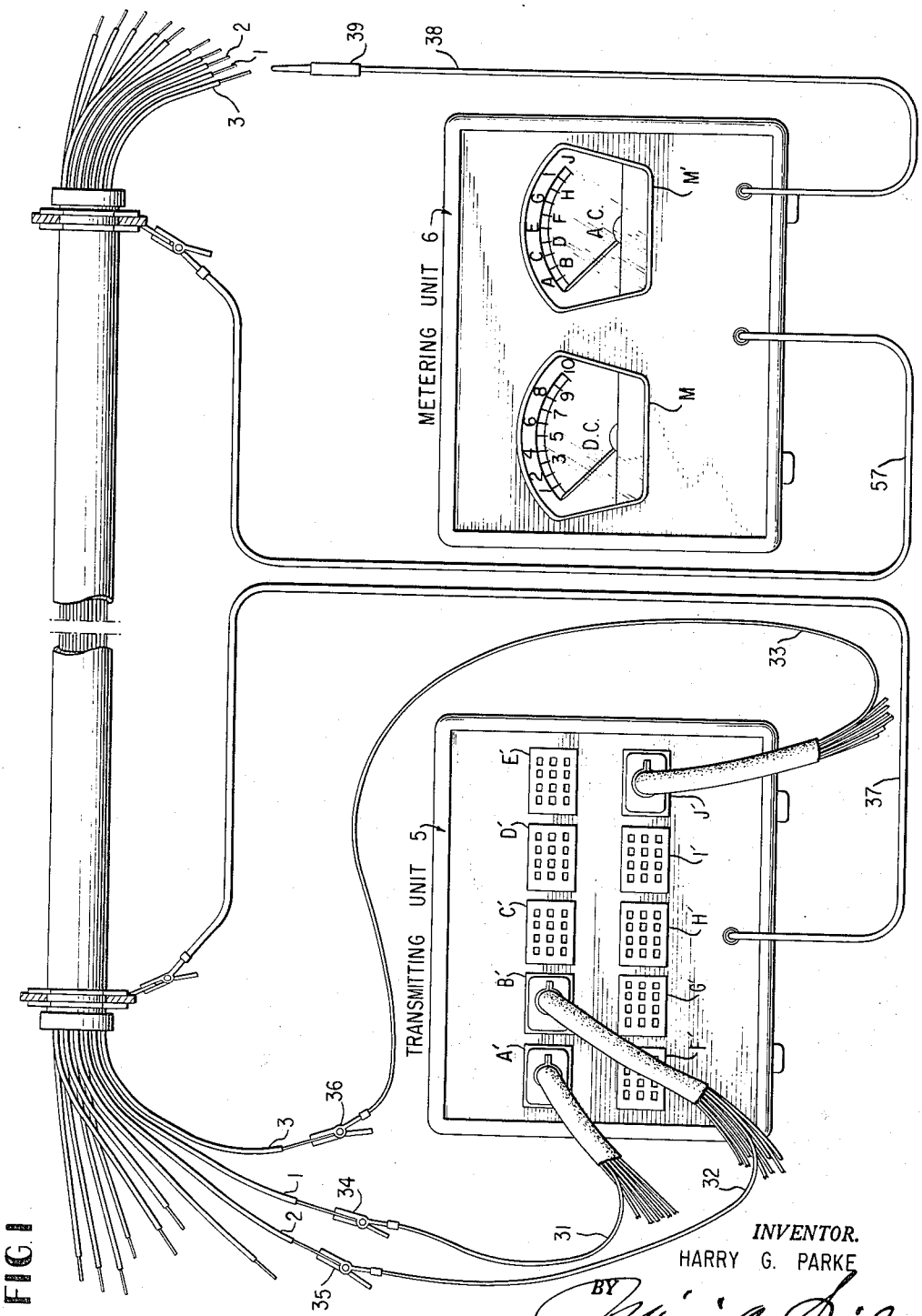
FIG. 1 is a diagrammatic elevational view showing a transmitting unit and a metering unit constructed in accordance with the invention and partially connected at the ends of a cable whose conductors are to be identified.

Referring now to the drawings, the reference numerals 1, 2 and 3 represent individual conductors of the cable whose conductors are to be identified. The identifying equipment comprises two separate units, a transmitting unit 5 and a metering unit 6. Inside transmiting unit 5 is a battery 7 and an oscillator 8, the oscillator having an output transformer 9 and two identical secondary windings 10, 11 tapped at a plurality of equally spaced points 12, 13, 14, 15, 16, 17. One end of winding 10 is grounded while the corresponding end of winding 11 is connected through switch 18 to the ungrounded side of battery 7. Therefore, corresponding points on the two windings, such as 12 and 15, 13 and 16, etc., will have identical alternating voltages but will differ in direct voltage by the voltage of battery 7. Between these corresponding points, 12 and 15, etc., are connected the resistor strings 19, 20, 21, each consisting of equal numbers of equal resistors, 22–30. At each junction of two resistors, there will be both an alternating and a direct voltage to ground. For all junctions in a particular resistor string, the alternating voltage will be the same but the direct voltage will depend upon the distance along the string. For junctions in corresponding positions in different strings, such as the junction between 22 and 23, and the junction between 25 and 26, the direct voltage will be the same but the alternating voltage will differ depending upon the string. Consequently, the alternating and direct voltages uniquely and systematically characterize each junction.

From the resistor junctions extend individual wires 31, 32, 33, terminating in connecting devices such as the alligator clips 34, 35, 36, adapted to connect to the cable conductors 1, 2, 3. For clarity, only three outputs are shown in FIG. 2. Preferably, 100 outputs, comprising 10 levels of alternating voltage and 10 levels of direct voltage, are used. Each resistor string, 19–21, etc., is desirably mounted on a separate multicontact socket such as A'–J' in FIG. 1, into which are plugged the wire leads 31, 32, 33. Preferably, the switch 18 is formed of an additional pair of contacts, paralleled on each socket, which are shorted when a set of output leads is plugged into any socket, thus ensuring that the battery is connected only when needed. Further, for a reason that will be clear later, an output is not taken from any junction where either the alternating or direct voltage is zero.

The metering unit 6 contains a test lead 38 and test probe 39 adapted to contact the conductors 1, 2, 3, etc., of the system being traced. To test lead 38 are connected a low pass filter 40 and a high pass filter terminating respectively in a direct voltage measuring circuit 42 and an alternating voltage measuring circuit 43. Preferably D.C. measuring circuit 42 is, as shown, an emitter follower transistor circuit, and A.C. measuring circuit 43 is an averaging emitter transistor detector but other D.C. and A.C. meter circuits can be used. In the illustrated circuits, battery 45 powers both, and sensitivity adjusting emans, such as rheostats 46 and 47, compensate for aging of battery 7 in the transmitting unit. The face of the D.C. meter M is divided into ten equal segment numbered 1 to 10 and the face of the A.C. meter M' into ten equal segments lettered A to J. Preferably, the lead 38 will plug into unit 6 through a jack (not shown) which also operates switch 44, the purpose being to protect battery 45 against discharge when not in use.

To complete an indicating measurement through any one of the traced wires 1, 2, 3, etc., the grounds of the transmitting unit and metering unit must be connected. Obviously, such connection may comprise individual connections of the units to a metal cable sheath, to metal connected parts of the ship or plane or to a common cable conductor already identified. In the drawings the ground connection is illustrated by the conductors 37 and 57 separately connected to a suitable ground adjacent the transmitting and metering units respectively.

To operate the above described apparatus, one man can connect up the 100 of the transmitter unit 5 to the conductors of the system being traced and the line 37 to a ground. He can then take the metering unit 6 to the other end of the system, connect line 57 to the metallic supporting structure on the ship or plane, and proceed to touch probe 39 to the system conductors successively. If the conductor touched has been connected to a transmitter output, the D.C. and A.C. meters M and M' will immediately indicate a number and a letter uniquely identifying the conductor. If the conductor touched has not been connected to an output of the transmitter unit, both meters will remain at their unmarked or zero positions. Since, as previously explained, the A.C. and D.C. potentials applied are never zero, confusion is prevented.

The advantage of using both alternating and direct voltages to identify a single conductor is that it permits the identification of $n^2$ conductors while only requiring the metering to be of sufficient accuracy to discriminate among n levels. While it is exceedingly practical to use a D.C. potential as one of the potentials applied to the conductors, two or more A.C. potentials of different frequencies and different potential levels can be used instead to identify each cable conductor by suitably modifying the apparatus.

Certain further modifications from the above will appear to those skilled in the art, for example: the use of two frequencies and three meters to distinguish among $n^3$ conductors, the use of two polarities of D.C., and the addition of tuning means in filter 41 to discriminate against 60 cycle pickup.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed is:

1. A portable device for identifying conductors of a multiconductor cable comprising a transmitting unit including means for generating a plurality of electrical potentials of differrent frequencies and different levels, said unit having a plurality of outputs for connection to the conductors to be identified, each output having an output signal potential composed of at least two frequencies and each output signal potential differing from another in at least one level of voltage of one of said frequencies, a metering unit for connection to the conductors at a point remote from said transmitting unit, said metering unit including filter means for separating said different frequencies of said output signals and indicating means for determination of the voltage levels at different frequency of said filtered output signals.

2. A device according to claim 1 wherein said transmitting unit comprises an oscillator including a transformer in its output circuit, said transformer having a pair of secondary windings connected in series with each other and a source of D.C. potential, each secondary winding being tapped equally at a plurality of points, the corresponding tapped points of said windings being connected by a string of resistors, and said transmitter outputs being the junctions between adjacent ones of said resistors in the transformer secondary.

3. A device according to claim 2 wherein one side of said source of D.C. potential and one side of one secondary winding are connected to a ground, and a ground connection is provided on the transmitting unit for connection to a ground in said metering unit.

4. A device according to claim 1 wherein said filter means includes high and low band pass filters.

5. A device according to claim 4 wherein said filters are respectively connected to A.C. and D.C. voltmeters.

6. A device according to claim 5 wherein said A.C. and D.C. voltmeters comprise emitter follower and averaging emitter detector transistor circuits.

7. In a device for identifying conductors of a multiconductor cable including a transmitting unit for generating potentials to be applied to the conductors and a metering unit for connection to the conductors at a point remote from the transmitting unit to measure the potentials in said conductors, the improvements wherein said transmitting unit comprises an oscillator including a transformer in its output circuit, said transformer having a pair of secondary windings connected in series with each other and a source of D.C. potential, each winding being tapped equally at a plurality of points, the corresponding tapped points of said windings being connected by a string of resistors, and the junction between adjacent ones of said resistors each forming a transmitter output to be connected to one of the conductors of the cable.

8. The method of identifying a plurality of electrical conductors which comprises simultaneously applying to each conductor a unique composite signal having components of at least two frequencies, the signal applied to each conductor differing from the composite signal applied to every other conductor in the potential of one of said components, selectively filtering said signals in each of said conductors at a point remote from the point of signal application to separate the components, and measuring the potentials of said separate components to identify said conductors.

9. The method of identifying a plurality of conductors which comprises the steps of simultaneously applying to said conductors a plurality of composite signals each having at least two components of different frequency, the composite signal applied to each conductor being unique in that the potential of one component differs from that of the same frequency component of signals applied to all other conductors having identical potentials for the component of the other frequency, and selectively measuring the potentials of the components in said conductors at a point remote from the point of application of said signal to identify the conductors.

10. The method of identifying a plurality of electrical conductors which comprises simultaneously applying to each conductor a composite signal having A.C. and D.C. components, the signals applied to each conductor differing in the potential of at least one of said components from the composite signals applied to every other conductor, selectively filtering the signals in said conductors at a point remote from the point of signal application to separate the A.C. and D.C. components, and measuring the potentials of said separated components to identify said conductors.

11. A device for identifying conductors comprising a unit for generating a plurality of electrical signals, said generating unit having a plurality of outputs for individual connection to conductors to be identified, each output providing a unique composite signal having at least two components of different frequency, the composite signal at each output differing from the composite signal provided at every other output in the potential of one of said components, and a metering unit for selective connection to conductors at points remote from said outputs and including indicator means for indicating the potentials of the components of said composite signals to identify said conductors.

12. The method of identifying a plurality of electrical conductors which comprises the steps of applying to one conductor a signal having components of at least two different frequencies and different potentials, simultaneously applying similar but unique composite signals having the same frequency components to the other conductors, said unique composite signal for one conductor differing in at least the potential of one compotent from the composite signals applied to every other conductor, and selectively measuring the potentials of said components of the composite signals in each of said conductors remotely from the point of signal application to identify the conductors.

References Cited by the Examiner

UNITED STATES PATENTS

| | | | |
|---|---|---|---|
| 2,869,077 | 1/1959 | Houk | 324—66 |
| 3,054,949 | 9/1962 | Bates et al. | 324—66 |
| 3,155,900 | 11/1964 | Hanken | 324—57 |

WALTER L. CARLSON, *Primary Examiner.*